(12) United States Patent
Meir

(10) Patent No.: US 9,179,079 B2
(45) Date of Patent: Nov. 3, 2015

(54) ACTIVE ADAPTIVE THERMAL STEALTH SYSTEM

(75) Inventor: Ronen Meir, Ashkelon (IL)

(73) Assignee: ELTICS LTD, Rishon Lezion (IL)

( * ) Notice: Subject to any disclaimer, the term of this patent is extended or adjusted under 35 U.S.C. 154(b) by 858 days.

(21) Appl. No.: 13/300,702

(22) Filed: Nov. 21, 2011

(65) Prior Publication Data
US 2013/0342701 A1 Dec. 26, 2013

Related U.S. Application Data (63) Continuation-in-part of application No. 12/679,686, filed as application No. PCT/IL2008/001301 on Sep. 25, 2008, now Pat. No. 8,080,792.

(30) Foreign Application Priority Data

Sep. 25, 2007 (IL) .......................................... 186320

(51) Int. Cl.
   *H01L 31/00* (2006.01)
   *H04N 5/33* (2006.01)

(52) U.S. Cl.
   CPC ...................................... *H04N 5/33* (2013.01)

(58) Field of Classification Search
   CPC ......... F41H 3/00; A41D 13/005; F41G 7/224; F41J 2/02; G05D 23/193; G05D 23/2723
   USPC .......................................................... 250/330
   See application file for complete search history.

(56) References Cited

U.S. PATENT DOCUMENTS

| | | | |
|---|---|---|---|
| 6,144,031 A | 11/2000 | Herring et al. | |
| 6,338,292 B1 * | 1/2002 | Reynolds et al. | 89/36.02 |
| 7,102,814 B1 * | 9/2006 | Hughes | 359/350 |
| 2004/0213982 A1 | 10/2004 | Touzov | |
| 2005/0045702 A1 | 3/2005 | Freeman et al. | |

FOREIGN PATENT DOCUMENTS

JP 9-296999 11/1997

* cited by examiner

*Primary Examiner* — Marcus Taningco
(74) *Attorney, Agent, or Firm* — Deborah Gador (57) ABSTRACT

The present invention relates to a thermal vision countermeasure system to enable concealment of objects from identification by thermal imaging night vision systems, including a screen made of thermoelectric modules, disposed between the target object and an IR detector. The screen, formed of at least one thermoelectric unit, is coupled to the target object, and the thermoelectric unit includes a Thermoelectric Cooler (TEC) module coupled to a plate formed of a material selected from aluminum, copper, or aluminum with copper, the plate being substantially larger than the TEC module.

20 Claims, 5 Drawing Sheets

ACTIVE ADAPTIVE THERMAL STEALTH SYSTEM

FIELD OF THE INVENTION

The present invention relates to a system and method of concealing objects from identification and recognition by thermal imaging night vision systems in general, and, in particular, to an active system and method for protecting objects from thermal imaging and from heat-seeking missiles.

BACKGROUND OF THE INVENTION

The impact of the target thermal structure on seeker and sensor acquisition is well known.

Night vision systems are used extensively for military and security purposes. These include thermal imaging cameras and ATR (automatic target recognition) systems that automatically classify targets by their thermal signature.

There are two principle approaches:

1) Detecting infrared radiation, which is a form of energy emitted by all objects regardless of the ambient light conditions, using an infrared camera.

2) Intensifying the small amount of light present, even at night, from the stars and the moon.

Most objects have a radiated temperature either higher or lower than their background. Even if the radiated temperature differences are less than a degree, they can be detected. If there is no difference between the temperature of an object and its background, the object cannot be seen by a thermal imaging night vision system or by infra red based heat seeking missiles.

Thermal imaging can see through light fog and mist and, more importantly, through most camouflage. The fire control systems of most armored vehicles have night vision, usually thermal imaging.

Today, solutions based on active countermeasures against infrared detection and tracking can be combined with passive stealth measures; these include infrared jamming (i.e., mounting of flickering infrared radiators to confuse the tracking circuits of heat-seeking missiles) and the launching of infrared decoy flares.

Usually, targets are easier to identify at night, because their radiated temperature is hotter than their background. Some targets, such as tanks and APCs, have internal temperature variations that form visible patterns. The shapes of the hottest vehicle parts, such as engines and exhausts, appear bright. Objects with a medium temperature, such as the warm tracks, appear dim. Objects with a cool temperature, such as the cool hull, appear black.

The sources of infrared energy are solar heat, fuel combustion heat, frictional heat, and reflected radiance.

Solar Heat—comes from the sun and affects the exterior surface of objects. The heating highlights the outline of the object, providing recognition cues to the viewer, which are usually similar to the overall appearance of the target. These shape cues are recognizable out to medium ranges (800 to 1,200 meters) and detected at long ranges (2,000 meters). Since the sides of vehicles have more defined contours, side views are usually easier to recognize than the front views.

Fuel Combustion Heat—comes from operating engines. The heat is conducted to the surfaces of the surrounding engine compartment. Because engine compartment temperatures reach up to 200 degrees F., the surfaces of these compartments radiate features that can be detected.

Frictional Heat—produced by the moving parts of vehicles. Its heat is less intense than the high temperatures from the engine combustion. Frictional heat is generated only when the vehicle is in motion and provides long-range cues to classify the vehicle as wheeled or tracked.

Reflected Radiance—smooth, glossy surfaces, such as windshields and glossy, painted fenders, reflect radiation images from other sources. These reflections can produce odd images.

A gun tube is visible when recently fired, as the gun tube is heated up. Similarly, the transport mechanism becomes warmer and more visible.

All Infrared (IR) direct threat weapons require line of sight (LOS) to be established prior to launch and the in-flight missile must maintain LOS with the target heat source until impact (or detonation of the proximity fuse). IR missiles require the operator to visually detect the target and energize the seeker before the sensor acquires the target. The operator must track the target with the seeker caged to the LOS, until it is determined that the IR sensor is tracking the target and not any background objects. In addition, semi-automatic homing IR missiles detect the missile and navigate by IR sensing of the target. The IR sensor is also susceptible to atmospheric conditions (haze, humidity), the signature of the aircraft and its background, flares, decoys, and jamming.

Man Portable Air Defense Systems (MANPADS) pose a serious threat to aircraft at present. Rather than simply providing a second bright IR source in an attempt to draw an approaching missile away from a targeted aircraft, Directed Infrared Countermeasures Systems (DIRCM) use beams of light produced by a variety of means, such as flashlamps, to exploit knowledge about the design of reticle-scan MANPADS seekers to defeat their homing mechanisms. In many MANPADS, a reticle within the seeker causes pulses of light from the target aircraft to "shine" on the missile's infrared detector. The IR detector senses the IR radiation and sends an electric signal to the guidance package, which determines the target location and allows the missile to track the target aircraft's location and movement through the sky. By shining a modulated light towards the seeker, an IRCM system provides the infrared detector with extra "false" data, which deceives or "jams" the missile, causing it to miss its intended victim.

Viewing targets during normal and limited visibility requires gunner training on thermal target recognition, identification, and engagement. The gunner or ATR must interpret unusual images with the night tracker. These images, called thermal target signatures or infrared target signatures, are different from the images seen in the day tracker. Targets stand out in these infrared images and can be recognized at long ranges on a clear night and at reduced ranges during limited visibility. However, the recognition task requires trained and experienced gunners so the task may not be simple.

Other terms that may enhance detection by thermal viewer and countermeasure by this patent—

During rain or snow, background objects and frictionally heated and solar-heated target features lose heat. Frictional heat loss is caused by water and mud collecting on the tracks, wheels, and other transport system parts. Engine compartment and exhaust temperatures remain high. Landmarks, such as trees, trails, and contour features, are often lost. The loss of heat in background objects reduces scene clutter, such as trees and rocks, and can increase target detection. In this type of situation the system ability of camouflage (stealth) is well needed.

In a target-rich environment on a dry, clear night, high-confidence identification requires a thermal image of such features as road wheels, turret shapes, gun tube and exhaust location. Thus, target recognition is a difficult task that requires an expert, so any change of heat signature will create chaos.

Accordingly, there is a long felt need for a system to permit objects to remain hidden from thermal detection devices, and it would be very desirable if this system can operate in a variety of different ways.

SUMMARY OF THE INVENTION

There is provided according to the present invention a thermal vision countermeasure system to enable concealment of objects from identification by thermal imaging night vision systems, including deception of heat seeking missiles. The system also permits the creation of false heat signatures and IFF specific signals and false battle situation awareness.

The basic approach is that thermal imaging cameras reveal images, and heat-seeking missiles lock onto the target, based on the temperature contrast between the areas which they view and the background area of the relevant objects. By placing a screen, the temperature of which is equal to that of the background, between the camera or missile sensor and the object, the thermal image recorded by the camera will fail to capture the image of the object itself, regardless of the actual temperature of the object, or the missile sensor will not find the target or will lock on an object which is hotter than the protected object.

The invention proposes the use of a screen, made of thermoelectric modules disposed between the target object and an IR detector. According to one embodiment, the screen is coupled to the target object, with a small air gap between them. The thermoelectric modules are controlled by a microprocessor, or by an analog chip. The temperature of the screen is controlled with the use of thermal imaging sensors, preferably long, mid- and short range, all in one, which continuously measure the background temperature (usually at the opposite side of the object from the viewer) or adapt the surroundings, and vary the level of power, based on the Peltier effect, in order to keep the surface temperature of the screen substantially equal to that of the background, even if the background is higher or lower than the ambient temperature. Thus, the present invention will confuse ATR systems, reconnaissance and gunners using thermal vision systems. Thus, in this adaptive system, the thermal signature of the screen is changed automatically when the screen moves relative to the background or the background looks different over time, as due to changes in weather—moisture, background texture and temperature, movement in the background, etc.

Under such circumstances, the object will become invisible to a thermal imaging camera, or a heat seeking missile. In fact, if the object is "invisible" to IR sensors, an operator will not be able to see it or to aim at it.

In one embodiment, the screen comprises a large number of individual thermoelectric cells, each of which is controllable on an individual basis. As a result, by purposefully varying the temperature of each cell, the object may appear in a different configuration, effectively giving the thermal camera or ATR system a false heat signature. For example, this could allow the image of a tank to appear like a car, or a large rocket to appear like to a small hand weapon or a big truck carrying weapons or supplies to appear as a small car.

There is also provided a method for providing protection against thermal vision detection, the method including coupling a screen formed of at least one thermoelectric module to a target object, coupling a controller to the thermoelectric module for controlling the thermoelectric module, measuring background and, possibly, ambient temperature and object temperature from a distance, preferably by using a thermal imaging camera collecting radiometric data, and providing an indication thereof to the controller, and varying the level of power provided to the thermoelectric module, in accordance with the indication, so as to create a selected temperature in at least part of the screen. According to one embodiment, the system also has a video image processor to capture the surrounding background and process the radiometric data thereof. The same radiometric data can be then created on the covering thermoelectric screen. For example, if the background is rocks and grass, the image processor will calculate with the aid of the CPU, the percentage and pattern of the thermal signature of the rock\grass and then will apply the same ratio and pattern on the covering plate to simulate the same type of infrared thermal background of both temperature and pattern. In this way, the camouflage result will be better than just one temperature level and, therefore, almost or no detection is possible. Radiometric data, i.e., the actual thermal image of a portion of the screen, is also collected periodically by the thermal sensor or camera and provided to the controller to correct any errors due to environmental factors that can cause a difference from the actual apparent temperature emitted by the active thermoelectric controlled pixels. These factors include water, rain, oil spill, dust, mud and the like. Any difference between the internal sensors located on the pixel or plate itself and the actual emitted temperature or emissivity is then detected and corrected A control signal is then sent to the pixels to accurately compare them to background. In this way, the accuracy of correspondence between the background thermal signature and the plate with pixels signature is very high, allowing the high level of stealth performance needed against advanced accurate thermal cameras\weapon sights, that are becoming more and more accurate and sophisticated and able to detect very small difference in temperatures.

The image video processor can also calculate average temperatures and find the horizon line to avoid above-horizon calculations. This is useful in the event of the platform changing its angle, such as a tank going downhill when the sensor ends up looking up in the sky. In this situation, the system will adopt the nearest temperature or the last temperature recorded before the change in angle.

The thermal imaging sensor is preferably mounted on pan tilt and receives data to keep the reading of the background in the desired field of view. The selected field of view can be pre-programmed in the system.

Preferably, this method may be used to create a fake heat signature for an object, or to change battle situation awareness.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to improvements devised for a thermal vision countermeasure system, which enables concealment of objects from identification by thermal imaging night vision systems and/or for deception of heat seeking missiles. The basic system is described in applicant's co-pending Israeli patent application no. 177368. The invention relates to the use of heat radiation to create equilibrium with the background radiation—hotter or cooler—in a plate screening an object to be camouflaged, by using controlled thermoelectric (Peltier effect) modules. The system also permits changing the observed heat signature of the object by generating a fake thermal signature for all or part of the object, so as to mislead a viewer. In this way, the target cannot be identified or classified, and a false battle situation awareness will be created. Activating the system according to the present invention will substantially reduce detection and view, in one case, or cause a mistake of target classification, in another case, depending on whether the user of the system selects a stealth or deception mode.

The screen is formed of at least one, and preferably of a plurality of thermoelectric (TEC) units and a controller for controlling individually the temperature of the thermoelectric units. While the screen can be formed of a single TEC unit, utilizing a plurality of smaller units provides greater flexibility and ensures operation of most of the screen, even in the event that one or more TEC units are damaged or cease to function. The controller is coupled to a power source coupled to the TEC units. The controller causes the power source to provide a level of power to the thermoelectric unit so as to generate a selected temperature in at least part of the screen.

According to some embodiments of the invention, a sensor is provided for measuring the temperature of one side of the screen or thermoelectric unit and providing an indication thereof to the controller. The controller uses this temperature to adjust the temperature, and thus, the thermal signature, of the TEC unit. According to some embodiments of the invention, an additional thermal imaging sensor is provided which continuously measures the background temperature behind the object being protected (usually at the opposite side of the object from the viewer), even at long distance. In these embodiments, the controller varies the level of power, based on the Peltier effect, in order to keep the surface temperature of the screen substantially equal to that of the background, even if the background is higher or lower than the ambient temperature. Thus, this embodiment can more completely confuse ATR systems and gunners using thermal vision systems.

In a preferred embodiment of the invention, each thermoelectric cooling unit (or TEC unit) includes the following: a thermoelectric heating/cooling thermo electric cooler (TEC) connected to a power source, which controls the heating/cooling of the TEC surfaces and, consequently, of plates coupled to one of those surface. The TEC is coupled to a metal plate formed of aluminum or copper or both. The plate may have any desired geometric contour. Preferably, the plate is substantially larger than the TEC (e.g., TEC surface area 60×60 mm, and metal plate area 220×220) and can be of various widths, preferably between about 2 to 5 mm. According to one embodiment, the plate is about 4 mm thick and therefore rigid and more suitable for military use.

Figure 7:
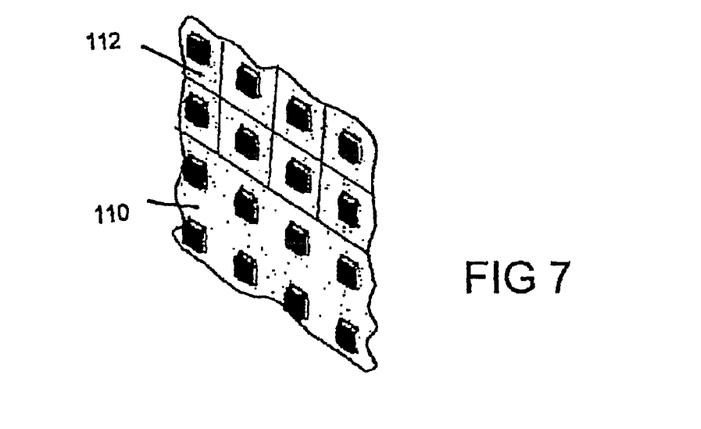
FIG. 7 is a schematic illustration of a plate in a system according to one embodiment of the present invention.

This plate with its TEC acts as one pixel, and several pixels like this can be mounted on a bigger plate to accommodate all of them together on same larger plate, as shown, for example, at 110 in FIG. 7. For example, an 880×880 plate can have a structure of 16 pixels of about 220×220 in a 4×4 matrix. Other structures can be made of a size that will be suitable to cover parts of the object to be protected. For example, a plate of 880×220 could be formed of 4 pixels in a row. Alternatively, as shown at 112 in FIG. 7, a number of smaller plates can be coupled to one another, as by screws. It will be appreciated that the pixels may have any shape or contour that permits them to match adjacent pixels.

The ratio of TEC to plate surface area can be between 1:1 (i.e., the entire surface is covered with TECs, although this is more costly) to about 1:14 for optimum cost/performance, and up to about 1:44, when using copper plates and advanced structure combined with heat pipes, thereby reducing overall cost, complexity and power consumption and making the system practical. Preferably, the TEC is positioned in the center of the plate. When a plurality of TECs are provided on a single plate or pixel, covering all or part of the surface area, they can be connected serially or in parallel and can act like a single TEC. The TEC is further coupled to a heat sink that absorbs heat from the TEC, the heat sink being coupled to a fan or liquid cooled heat sink, or heat pipes with additional heatsink, which dissipates heat from the TEC.

It will be appreciated that each such pixel can have a different temperature from its neighboring pixels. In this way, a "textured" thermal signature, controlled by the controller with a softward algorithm, can be generated, which is substantially more realistic against a natural background than a signature of a single temperature. If desired, a groove can be provided in the plate between adjacent pixels so as to separate the thermal flow and reduce heat transfer from one plate to the other and permit more accurate control. Furthermore, different plates can be mounted at different angles relative to the sky so as to deflect radar radiation and reduce the radar reflection of the object. For example, a portion of the plates can be angled upwards while a portion of the plates is angled downwards. In this way, the radar return signature can also be lowered.

Figures 1A, 1B, 2A, 2B:
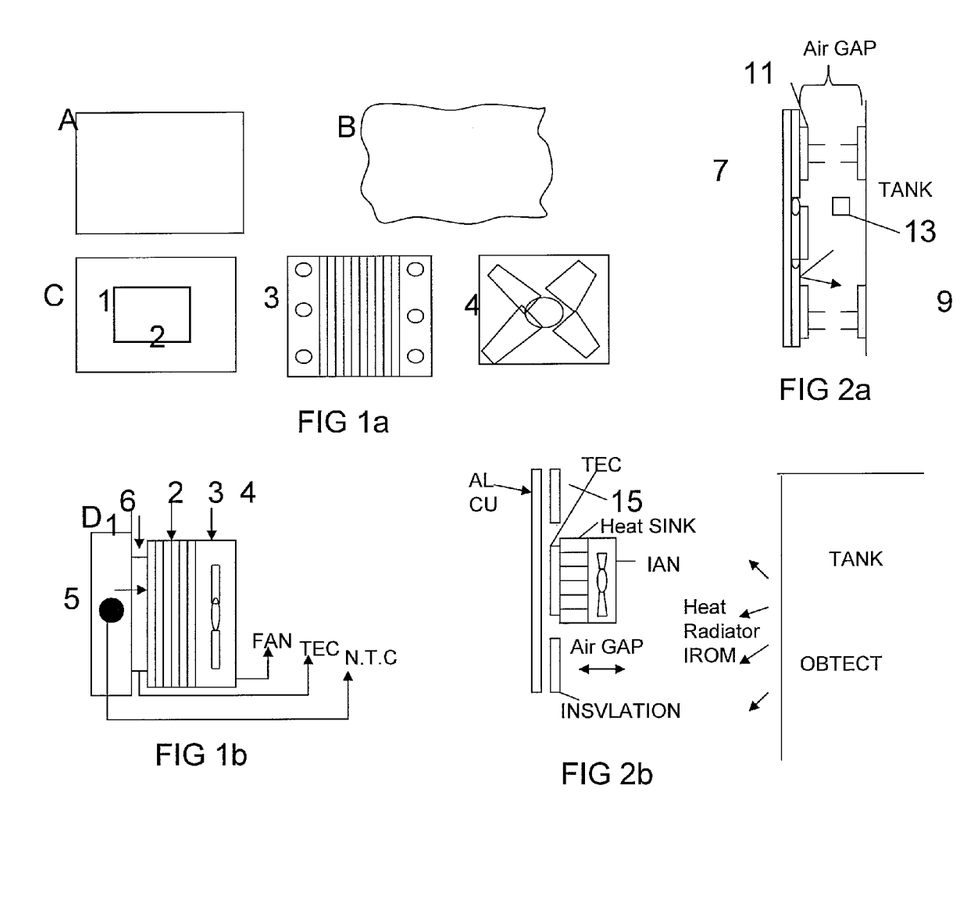
FIG. 1a and FIG. 1b are schematic exploded and assembled illustrations of a TEC unit constructed and operative in accordance with one embodiment of the present invention.
FIGS. 2a and 2b are schematic illustrations of TEC units of one embodiment of the invention coupled to different objects to be protected.

Referring to FIG. 1a there is shown a schematic illustration of various parts of a TEC unit constructed and operative in accordance with one embodiment of the invention. The unit includes: a metal plate 1, illustrated in "A" as being rectangular in shape, and in "B" as having curved edges, a TEC 2, a heat sink 3 and a fan 4. FIG. 1b shows a schematic illustration of TEC unit 5 wherein: metal plate 1 is coupled to TEC 2 which is further coupled to heat sink 3 which dissipates heat using fan 4. According to this embodiment, the process of cooling the outer side of plate 1 is as follows: heat is removed from the outer side of plate 1 by means of TEC 2, the heat is then conducted to the inner side of TEC 2, this heat is absorbed with heat sink 3 and then dissipated into the surrounding environment utilizing fan 4. This process allows rapid cooling of plate 1. Conversely, by reversing the polarity of the voltage\power to the TEC 2 under control of the CPU, the TEC will change the direction of heat flow, i.e.,—the cool side will become the hot side, and vice versa, so as to provide heating of plate 1. The polarity and pulse width modulation power level are controlled by the CPU, preferably according to radiometric data from the thermal imaging sensor and video processor, using chip embedded algorithms for best adaptation to the background.

Referring to FIG. 2a and FIG. 2b, there are shown schematic illustrations of a TEC unit in relation to a surface that requires camouflage, constructed and operative in accordance with one embodiment of the invention. TEC unit 7 is coupled to surface 9, preferably using shock absorbers 11 across an air gap 13. It will be appreciated that air gap 13 is of dimensions so as to provide sufficient thermal insulation of the camouflaged surface, preferably a few millimeters to a few centimeters. This insulation prevents heat generated at the camouflaged surface from reaching metal plate 1 via convection and changing the temperature generated by the TEC. The back side of plate 1 may further include heat radiation insulators and reflectors 15, to reduce the effect of heating of plate 1 by heat radiated from surface 9. Shock absorbers 11 allow easy and safe coupling of the TEC unit to the camouflaged surface 9. The shock absorbers allow the sensitive TEC unit a degree of freedom, protecting the unit when surface 9 is in motion or vibrating.

In one embodiment of the invention, the TEC unit is constructed so that the substantially smaller TEC can perform uniform cooling or heating over the entire surface of the plate (which is substantially larger). In accordance with this embodiment, there are shown schematic illustrations of the back (FIG. 3a), and front (FIG. 3b) side of a TEC unit 31. Metal plate 36, made of copper or aluminum, or a combination of both, that preferably is painted in the side facing outside, is drilled with a plurality of holes 33, preferably of diameter between about 2-10 mm. The holes may be drilled in every location on the metal plate except for area 30, which is directly above the TEC itself. The holes reduce the overall weight of the TEC unit, thus allowing more flexible use in various applications (in particular, applications in which the weight of the TEC\plate unit is a substantial parameter). It is a particular feature of this embodiment of the invention that holes which are sufficiently small are not seen from distances above 50 meters, or so, by conventional thermal imaging devices.

Figure 3A:
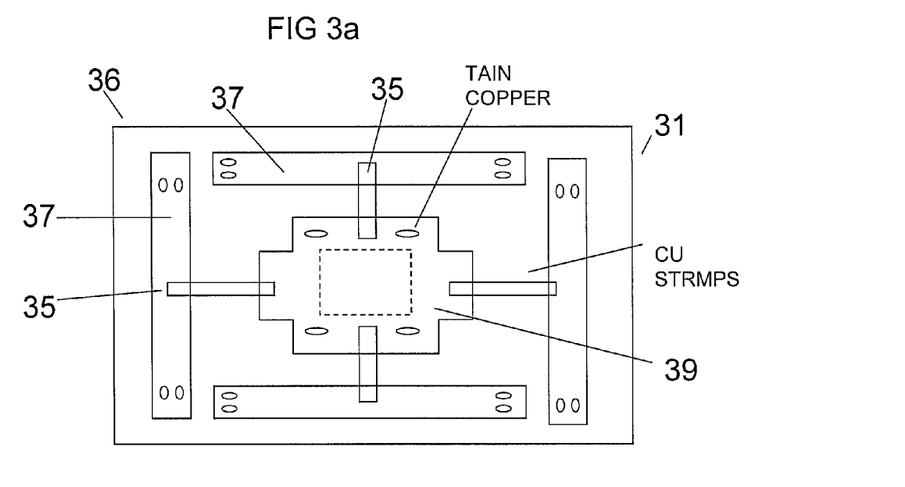
FIGS. 3a and 3b are schematic front and rear plan view illustrations of a TEC unit, constructed and operative according to a preferred embodiment of the invention.
Figure 3B:
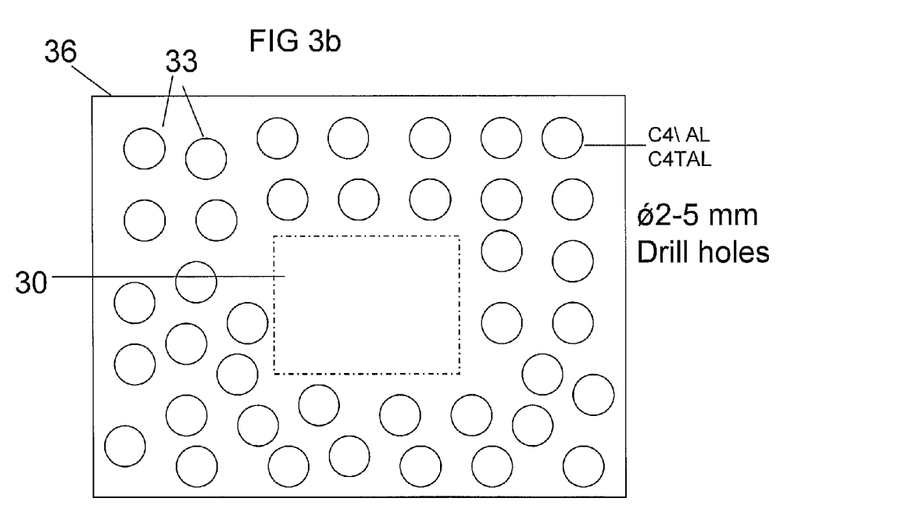

According to one embodiment of the invention, the holes are drilled through about 90% of the thickness of the plate, so they do not penetrate to the side of the viewer. In this way, the weight of the plate can be reduced, and there will be no holes to be observed by one looking at the target. In addition, about 10% or more of the metal remains to conduct the heat. Preferably, the holes are designed such that sand or dust will not fill them. In this way, the surface thermal flatness distribution is better.

TEC 39 is bolted to aluminum plate 36. One or more heat pipes 35 are coupled to aluminum plate 36 and/or to the heat sink. A plurality of metal strips 37 are coupled to aluminum plate 36. Strips 37 are thin copper strips, which can be, for example, about 20 on each pixel plate\TEC, which are positioned at, or near, the perimeter of plate 36. When heat is conducted from plate 36 to TEC 39 (plate thermal transfer), the pipes and strips allow the plate to cool uniformly (the TEC may heat the plate using the same mechanism, cooling was given as an example only) on its entire surface. The ability to cool the surface uniformly improves the response time and efficiency of TEC unit 31. Furthermore, the rapid and uniform heating and cooling is an important feature of the invention as it improves the reaction time of the camouflage plates.

Figure 4:
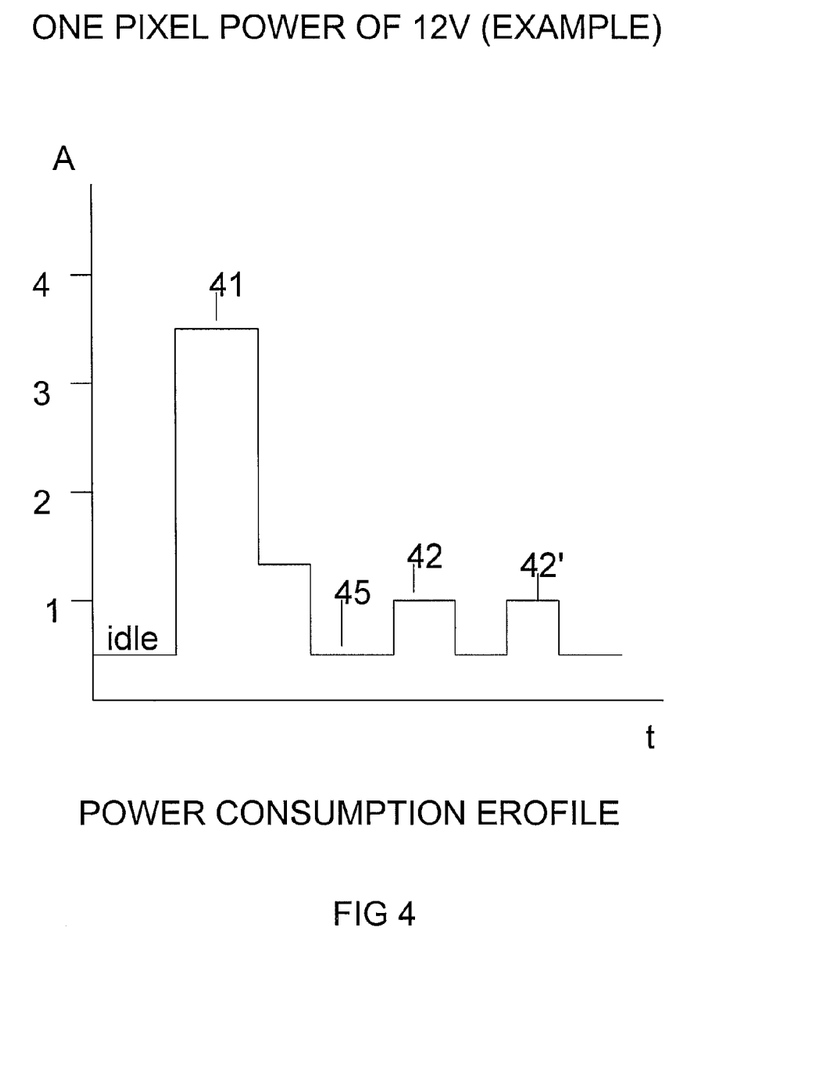
FIG. 4 is a schematic illustration of a power consumption profile for a TEC unit.

In another embodiment of the invention, electrical power delivered to the TEC unit is controlled so as to reduce the overall consumption of energy while retaining the TEC unit's ability to change temperature rapidly. It is a particular feature of the invention to provide the TEC unit with electrical current that is delivered in a specific pattern over configured periods of time. This pattern preferably is controlled by the CPU and embedded software. Referring to FIG. 4, there is shown a schematic illustration of one example of a power consumption profile for a TEC unit (not shown), illustrating the power management inherent in the present system—the software is designed to provide high power for short time when a rapid change is required, which is possible due to the fast reaction time of the plate, and then low power to maintain the desired temperature, once stealth mode, or the desired temperature, is reached. In particular, the system aims to provide the lowest power consumption possible for maintenance. While an exemplary graph is presented here, it will be appreciated that the actual graph for each TEC will depend on other parameters around the object, particularly ambient temperature, pixel temperature and radiometric data. This data is also calculated by the controller or CPU.

Firstly, the TEC unit receives a high current power 41, which causes the rapid heating (or cooling) of the TEC, leading to the heating of the TEC unit's surface (1 in FIG. 1). This rapid heating causes the temperature of the surface to pass the selected temperature (which may be determined according to programmed settings, see applicant's co-pending application, described above). After the first pulse, there is a period of time 45 in which the TEC unit does not receive high power. It will be appreciated that these time periods are not fixed. Rather, they depend on the ambient temperature and the pixel temperature, as well as the screen or plate temperature. This period allows the plate to cool down and reach the pre-selected temperature. When the temperature continues to drop, the TEC receives another current pulse 42 (smaller then pulse 41), which again, causes the temperature to rise slightly above the preset temperature. This process can be repeated (pulse 42'), thus maintaining the temperature substantially close to the preset temperature. This feature reduces the power consumption of the TEC unit, as it does not require high current to be provided all the time. Rather, once the plate reaches the preset temperature, the TEC only needs low power to maintain that temperature. This power pattern can also use the well-known PID (power integration derivative) loop formulation, for better accuracy.

According to another embodiment of the invention, a system and method are provided for calibrating the TEC unit's radiated temperature to that of an ambient distant object. The system includes: a thermal radiation camera (e.g. thermal camera imaging, or an infrared temperature gun or any other compatible application for measuring temperature at a distance), means, such as a motor, for turning the camera, a TEC unit (or a plurality of units), all coupled to a decision making unit and video image processor that provides radiometric data to the CPU which controls all parts of the system.

Figure 5:
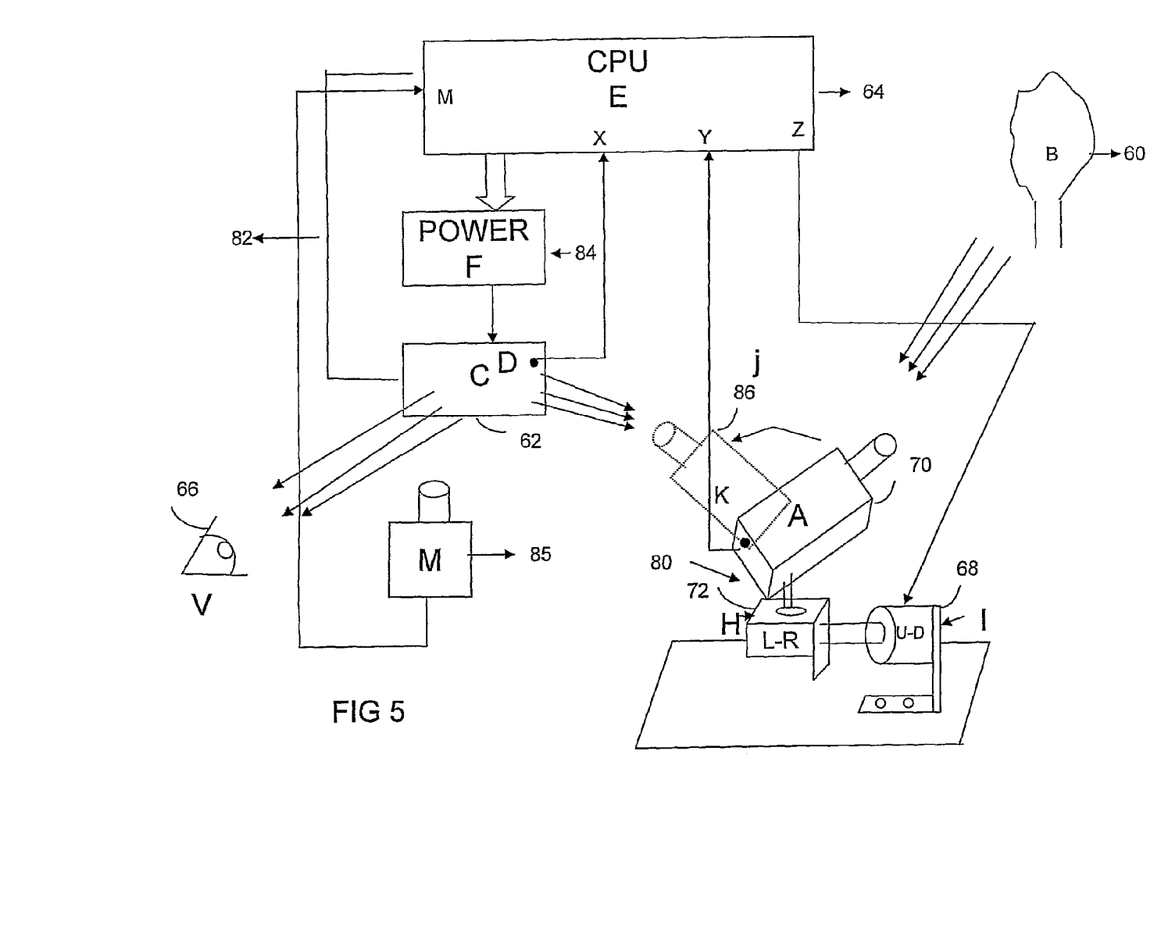
FIG. 5 is a block diagram illustration of a system for compensating for emissivity, according to one embodiment of the invention.

It will be appreciated that, due to emissivity of the TEC\plate units and changing environmental conditions, the temperature of the TEC unit that is actually observed is different from the pre-selected target or desired temperature. In this case, it is desirable to adjust the temperature of the TEC unit so that the observed temperature is the desired temperature to achieve precision matching. Referring to FIG. 5 there is shown a schematic illustration of a calibration system, constructed and operative according to one embodiment of the invention, for compensating for emissivity of a TEC unit (or units) (the radiometric differential between the viewed background and a reference plate in the screen as viewed), so as to provide a thermal signature substantially the same as that of an ambient, distant object. The system includes: a temperature measuring unit 80 which includes: thermal camera 70 which is coupled to electrical rotating motor cam 72 and 68, controlled by a controller 64, and a temperature control unit 82 which includes: controller 64 (can be a processor (CPU), CPLD, or DSP circuit) coupled to control unit 68 and to camera 70, further coupled to power unit 84 and to TEC unit 62. TEC unit 62 can be a single large plate, or can be a plurality of pixels, as described above. In this case, a single central CPU is coupled to, and coordinates operation of, all the TEC pixels. Alternatively, several CPU's or CPLD's can be utilized, each coupled to different groups of pixels. Camera 70 measures the temperature of distant object 60 with the aid of a video image processor with radiometric output, or by using a thermal camera with radiometric output, and provides an electrical signal corresponding thereto to controller 64, which activates power unit 84 to heat TEC unit 62 to the measured temperature of object 60. The electrical cam rotates camera 70 to position 86. Camera 70 then proceeds to measure the actual observed temperature of TEC unit 62 and reports the information to controller 64. Controller 64 compares the measured temperatures of object 60 and TEC unit 62 and adjusts the temperature of TEC unit 62, by providing current through power unit 84, so that the temperature radiated towards viewer 66 will be substantially equal to that of object 60.

According to one embodiment of the invention, a second, fixed thermal camera 85 is provided that looks at the TEC unit plate 62 at all times. While this eliminates the need for rotation of camera 70 from object to TEC, it is less preferred as two cameras will provide larger errors and cost more (since it is difficult to calibrate them the same). In this case, periodic internal calibration between the two cameras is required.

Figure 6:
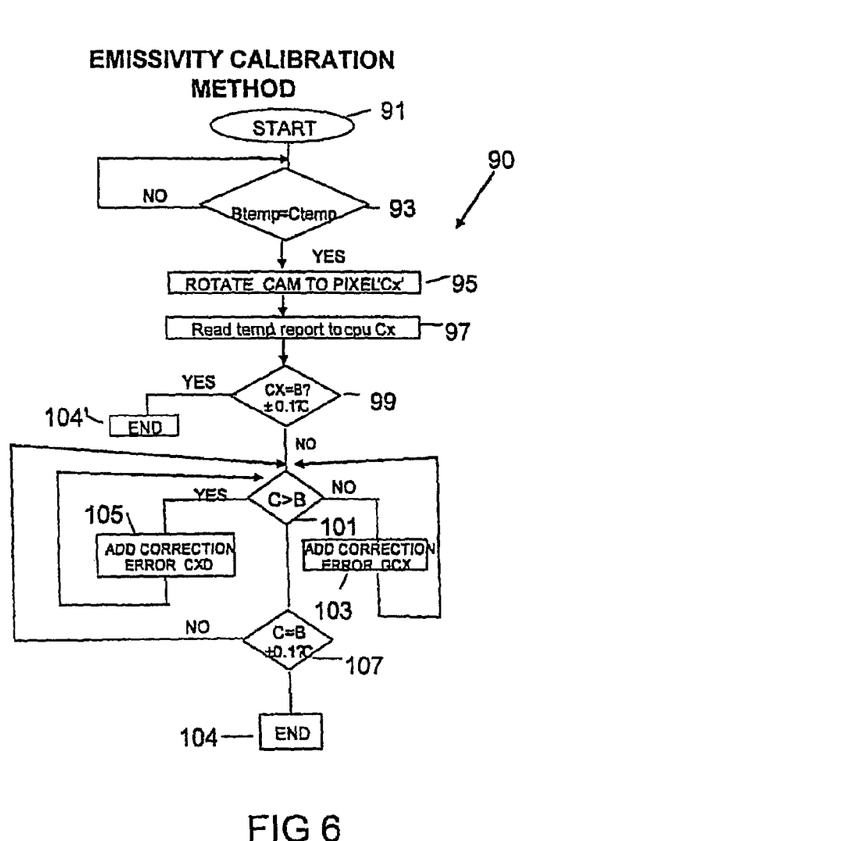
FIG. 6 is a block diagram illustration of a method for compensating for emissivity, according to one embodiment of the invention.

Referring to FIG. 6, there is shown a block diagram of a calibration algorithm 90 constructed and operative in accordance with this embodiment of the invention. Algorithm 90 is one logical method for calibrating the thermal radiation emitted by TEC unit 62 (in FIG. 5) with that of object 60 (in FIG. 5). This algorithm is programmed into CPU 64 (in FIG. 5) in physical DSP circuitry or into memory. The algorithm begins with start order 91, after which condition block 93 is applied. Condition block 93 requires that the temperature of object 60 will equal that of TEC unit 62 (the temperature is measured directly from TEC unit 62 using a thermocouple or other means). If the temperatures are not equal the algorithm requires the system to check the temperature again. Once the temperatures are reported equal, an order block 95, to rotate camera 70 to position 86 is given. Once this is done, a temperature readout is provided to CPU 64 in block 97. Condition block 99 requires the temperature measured by camera 70 of TEC unit 62, to equal that of the measured temperature of object 60 within a highly accurate margin, such as of ±0.1° C. If the temperatures are equal within this margin the algorithm ends [block 109']. If this condition is not met, the algorithm continues to condition block 101. This condition determines if the camera measured temperature of TEC unit 62 is higher than that of object 60. If this is the case, a correction is added to the temperature of TEC unit 62 via power unit 84, lowering the TEC unit's temperature by the difference between the temperatures obtained from object 60 and the one obtained from the TEC unit 62. (Preferably, both temperatures are obtained with the same camera). After this addition, condition block 101 is provided again. If camera measured temperature of TEC unit 62 is lower than that of object 60, then a correction is added to the temperature of TEC unit 62 via power unit 84 raising the TEC unit's temperature by the difference between the temperature obtained from object 60 and the one obtained from the TEC unit 62. Once the two temperatures are substantially equal, the algorithm 90 proceeds to condition block 107. Condition block 107 requires the temperatures that were substantially equilibrated to be equal within a margin of ±0.1° C., as a non-limiting example only. If the temperatures are equal within this margin, the algorithm ends [block 109]. If not, the algorithm returns to condition block 101.

Thus, this method compensates for emissive errors by correcting any differences in observed temperature (radiometric differential) between a background object and the plate due to external factors—rain, dust, mud, etc. This result is then transferred to all the other plates protecting the object, so a large number of plates covering an object will all be accurately calibrated to the object behind the camouflaged object.

It will be appreciated that dust or any other material that may cover the plate may change the emissivity of the plate and, potentially, can cause bigger temperature differences. This method overcomes this problem.

The system is capable of working on the entire Infra Red Spectrum, and especially 7-14 μm and 3-5 μm bands.

It will be appreciated that, preferably, the plate is painted with the same paint and/or the same color as used on the object to be protected.

According to an alternative embodiment of the invention, a plurality of different signatures are created around the target object, each facing different directions. This embodiment provides protection for a target object from thermal seekers looking from different directions and angles. Thus, one set of TEC plates can be placed above the object, to protect against UAV or other identification from the air, while others are placed in front and on the sides of the target, to protect against a viewer or attacker from the side. It will be appreciated that the background viewed by a viewer will be different at each angle. Therefore, preferably thermal cameras or other sensors are aimed at the object from various angles, each providing the heat signature of the background it sees. The thermally controlled pixels provide the signature that preferably includes the texture of the background in each direction, according to the video imaging processor and CPU data. In this way, for example, a tank parked on asphalt in front of trees can be screened by TEC units creating the thermal signature of trees, when viewed from the side, and of asphalt, when viewed from above.

It will be appreciated that various TEC units can be used to generate multiple signatures when viewed from one angle. For example, the left side of the object can project the thermal signature of the right side background and vice versa, or front and back can be interchanged, as desired.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. An infrared detection countermeasure system for a target object, the system comprising:
    a screen, including at least one thermoelectric unit coupled to a plate, couplable to a target object;
    a power source coupled to each said TEC unit;
    a controller for controlling individually each said at least one TEC unit, said controller coupled to said power source for causing said power source to provide a level of power to each said thermoelectric unit, so as to generate a selected heat signature in at least part of said screen;
    a video image processor coupled to said controller;

a thermal imaging camera, mounted on pan tilt and configured to capture thermal images of a portion of said screen in a first position, and then capture thermal images of a background of the target object in a second position, and provide said captured images to the video image processor; and a motor, controlled by said controller, coupled to said thermal imaging camera, for selectably rotating said camera, thereby causing said camera to alternately face said screen or said background;

wherein said controller is configured to receive and compare radiometric data of the processed image of the background and radiometric data of the processed image of the screen and to control said power source to adjust the temperature of said screen so that the observed thermal signature image as captured by said thermal imaging camera will be substantially the same as the observed thermal signature image of said background.

2. The system according to claim 1, further comprising a database including a plurality of fake thermal signatures accessible by said controller;

wherein said selected heat signature is selected from one of said fake thermal signatures in said database;

and wherein said controller compares radiometric data of processed images of the screen captured by said thermal imaging camera with radiometric data of the fake thermal signature and controls said power source to adjust the temperature of said screen so that the observed thermal signature image as captured by said thermal imaging camera will be substantially the same as the thermal signature image of the fake thermal signature.

3. The system according to claim 1, wherein a ratio of TEC surface area to plate surface area is 1:1.

4. The system according to claim 1, wherein said plurality of TEC modules are mounted on a single pixel.

5. The system according to claim 1, wherein several TEC modules mounted on pixel plates are mounted on a larger plate.

6. The system according to claim 5, wherein said larger plate includes grooves between said TEC modules.

7. The system according to claim 1, wherein the plates of several TEC units are coupled directly to one another.

8. The system according to claim 1, wherein said plate is shaped to a selected geometric contour.

9. The system according to claim 1, wherein said thermal imaging camera is mounted on pan tilt further receives data in the second position to keep the image of the background in a desired field of view.

10. The system according to claim 1, further comprising a plurality of heat pipes coupled to the plate from a center area to an area in close proximity to edges of the plate to improve plate thermal transfer, so as to improve plate reaction time and uniformity.

11. The system according to claim 10, further comprising a plurality of metal strips coupled to the plate and positioned at, or near, the perimeter of the plate.

12. The system according to claim 1, further comprising a shock absorber disposed between at least one of the plates and the object.

13. The system according to claim 1, further comprising:
a processor in said controller configured to receive said radiometric data and to cause said power source to provide a first pulse of selected power and length of time for creating a selected temperature of at least one of said TEC units; and then to cause said power source to provide a plurality of pulses of lower power for selected lengths of time to maintain said selected temperature, in response to said radiometric data.

14. The system according to claim 1, further comprising
at least one thermal sensor coupled to said thermoelectric unit providing temperature data of one side of said thermoelectric unit to said controller.

15. A method for providing infrared detection countermeasures for a target object having a screen coupled thereto, said screen including at least one thermoelectric unit coupled to a plate and to a power source and a controller coupled to the power source, the method comprising:

alternately capturing thermal images of a portion of the screen radiated towards a viewer by a screen thermal imaging camera mounted on pan-tilt in a first position facing the screen;

alternately capturing thermal images of a background of the target object by said thermal imaging camera in a second position facing the background;

providing said captured thermal images to a video image processor coupled to the controller, the video image processor processing said thermal images and providing radiometric data therefrom to the controller;

comparing, in said controller, radiometric data of the processed images of the background with radiometric data of the processed images of the screen; and controlling individually each said at least one TEC unit so as to generate a selected temperature in at least part of said screen by controlling said power source to adjust the temperature of said screen so that the observed thermal signature image as captured by said thermal imaging camera is substantially the same as the observed thermal signature image of said background.

16. The method according to claim 15, further comprising:
receiving said radiometric data in a processor in said controller;

said controller causing said power source to provide a first pulse of selected power and length of time, causing heating (or cooling) of at least one of said TEC units to reach a selected temperature;

in response to said radiometric data, determining in said controller that said TEC unit is cooler (or hotter) than said selected temperature; and said controller causing said power source to provide a plurality of pulses of lower power for selected lengths of time to maintain said selected temperature, in response to said determination.

17. The method according to claim 15, further comprising selecting said selected thermal signature from a plurality of false thermal signatures accessible by said controller.

18. A method for conserving energy in an infrared detection countermeasure system for a target object having at least one thermoelectric (TEC) unit coupled to a controller controlling a power source coupled to the TEC unit, the method comprising:

providing a first pulse of selected power and length of time, causing heating (or cooling) of the TEC unit to reach a selected temperature;

providing an indication of temperature of said TEC unit to a controller;

in response to said temperature indication, determining in said controller that said TEC unit is cooler (or hotter) than said selected temperature; and providing a plurality of additional pulses, of lower power than said first pulse, for selected lengths of time, in response to said temperature indication, to maintain said TEC unit at said selected temperature.

19. The method according to claim 18, further comprising selecting said selected temperature from one of a plurality of false thermal signatures accessible by the controller.

20. The method according to claim 18, further comprising selecting said selected temperature from a heat signature of a background of the target object.

* * * * *